Oct. 17, 1939.  J. P. SANNER  2,176,722
TESTING MACHINE
Filed Feb. 25, 1938  2 Sheets-Sheet 1
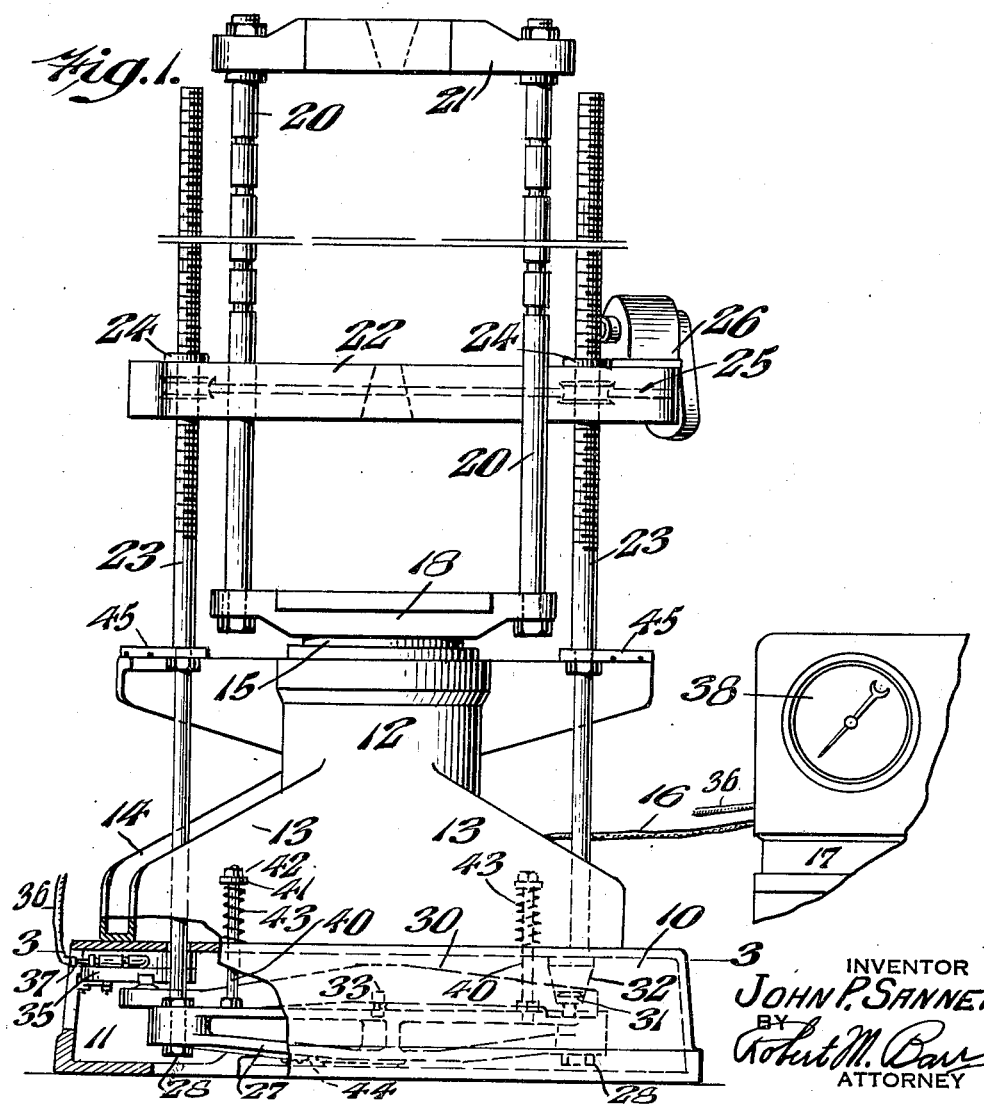
INVENTOR
JOHN P. SANNER.
BY
Robert M. Barr
ATTORNEY Patented Oct. 17, 1939

2,176,722

UNITED STATES PATENT OFFICE 2,176,722

TESTING MACHINE

John P. Sanner, Philadelphia, Pa., assignor to Tinius Olsen Testing Machine Company, Philadelphia, Pa., a corporation of Pennsylvania Application February 25, 1938, Serial No. 192,605

5 Claims. (Cl. 265—14)

The present invention relates to testing machines and more particularly to an improved weighing system for tension and/or compression testing machines.

Some of the objects of the present invention are to provide an improved weighing system for testing machines; to provide an improved weighing system of the hydraulic support type; to provide a novel weighing system wherein the load upon the specimen under test is transmitted to a hydraulic support through the medium of a lever so fulcrumed and associated with the stressing mechanism as to give a true and accurate measure of the aforesaid load; to provide a weighing system in combination with an indicator whereby direct load readings appear on said indicator; to provide a hydraulic support in association with a load actuated lever whereby the hydraulic support carries only a small percentage of the total load on the specimen; to provide a weighing system wherein a hydraulic support is more accessible than in prior weighing systems, and can be easily removed and assembled in contrast to previous constructions which have necessitated a complete taking down of the load applying mechanism; to provide a hydraulic support having a relatively small area of diaphragm whereby increased sensitivity is secured; to provide a weighing system wherein the heavy masses generally used in multiple lever type machines are materially reduced; to provide a weighing system of the hydraulic type wherein relatively less volume of liquid is required than in prior comparable systems; and to provide other improvements as will hereinafter appear.

Figure 3:
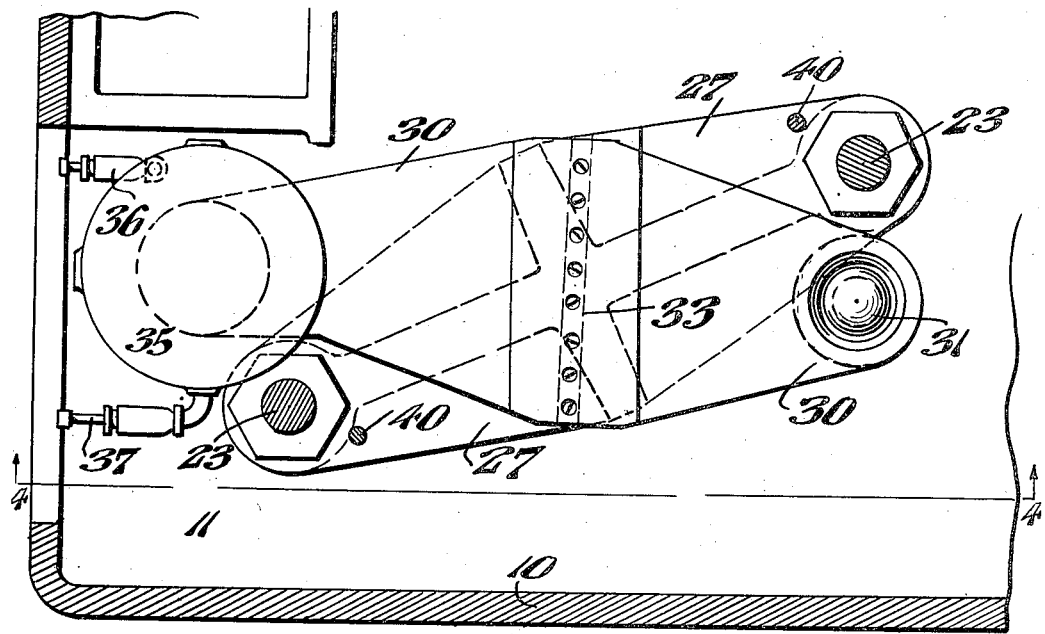
Figure 4:
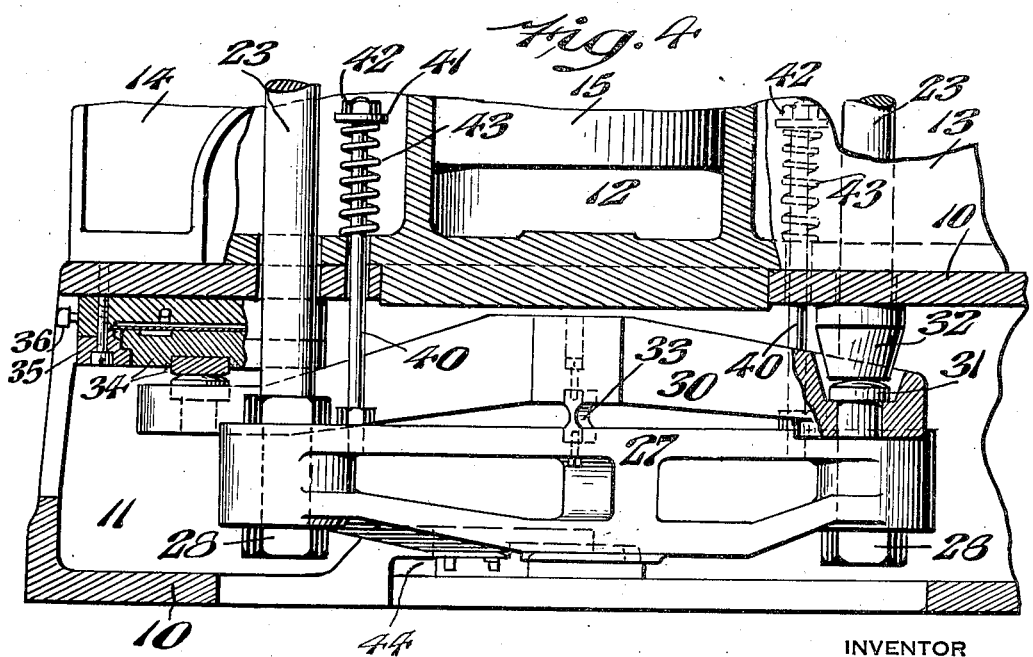

In the accompanying drawings Fig. 1 represents a side elevation, partly broken away, of a universal testing machine embodying one form of the present invention; Fig. 2 represents a plan of the same; Fig. 3 represents on an enlarged scale a section on line 3—3 of Fig. 1; Fig. 4 represents a section on line 4—4 of Fig. 3.

Referring to the drawings one form of the present invention consists of a base 10 of relatively massive walled construction forming an internal space 11 for receiving the novel weighing mechanism of the present invention. This base 10 serves as a support for a vertically disposed cylinder 12 which is stabilized by suitable divergently arranged webs 13 and 14 and forms with its piston 15 the stressing or force applying means. Therefore to actuate the piston 15 on its working stroke the cylinder 12 communicates by way of a pipe 16 with a fluid pump 17 subject to control in the well known manner of such hydraulic ram systems. As a matter of fact the ram and its associate operating components may be of any conventional type since the invention here relates to the weighing system.

For the purpose of transmitting the test force or stress to a specimen, the piston 15 carries a transversely disposed cross-head 18 provided with extension tension loading columns 20, which rise from the respective ends thereof, and are interconnected by a cross-head 21 arranged to assume by adjustment any one of a number of positions in accordance with the length of the specimen to be tested. Thus there is a lower cross-head 18 and an upper cross-head 21, the former acting through the rods 20 and upper cross-head 21 for tension tests, and acting directly upon the specimen for compression tests.

It will be evident that the cross-head 18, load columns 20 and cross-head 21 form a unitary frame which follows and is subject to the movement of the piston 15.

In order to weigh the force applied by the aforesaid frame to a specimen under test, a weighing table 22 is interposed between the two cross-heads 18 and 21, being mounted on threaded rods 23 through the medium of leader nuts 24 in the form of worm wheels which may be manually or mechanically driven. As shown a worm shaft 25 actuated by a motor driven chain 26 is used. This construction makes it possible to quickly locate the table 22 in testing position according to variations in length of the test specimen. The rods 23 pass downwardly into the space 11 and through the respective ends of a yoke 27 where suitable nuts 28 fasten the parts for movement in unison. Associated with the yoke 27, and in the path of movement thereof is a lever 30, one end of which is provided with a bearing block 31 which is preferably of convex contour.

This block 31 coacts with a bearing seat 32 which is fixed to the stationary base 10. Intermediate the ends of the lever 30 is a fulcrum 33 mounting the lever 30 upon the upper face of the yoke 27. The yoke 27 and associated parts 22 and 23 of the movable structure are constrained to move in a vertical direction parallel to the load force by means of frictionless flexible stay plates 44 and 45 respectively connected to the stationary structure. The end of the lever 30 which is opposite to the bearing block 31 bears against the movable column 34 of a hydraulic support 35. This hydraulic support 35 is bolted or otherwise made fast to the base 10 at a location eccentric to the axis of the loading mechanism and is of relatively small diameter as compared to hydraulic supports which are designed to receive and are exposed to the direct load upon the specimen. Since the hydraulic support is of the diaphragm type the smaller size (made possible by the novel lever construction) allows the diameter of the diaphragm to be so reduced as to greatly increase the strength and rigidity of the unit. As a result the hydraulic support employed with the present invention has a far longer life than any such support used with direct loading. A pipe 36 leads from the pressure chamber of the hydraulic support to a suitable gage 38 which is calibrated in terms of direct load and is responsive to pressure conditions in the aforesaid support. An inlet connection 37 is provided so that the proper quantity of the liquid medium can be maintained in the support. Compression of the fluid medium and flexing of the diaphragm is caused by the movement of the column 34 as influenced by the lever 30. Furthermore by the present construction, use of a relatively small diaphragm chamber makes possible an appreciable diminution in the volume of liquid used to transmit motion to the indicating gage.

As a means to preload the hydraulic support 35 so that it has an initial setting with which the pressure gauge 38 is set for zero reading, the yoke 27 is attached to two studs 40 which pass upwardly through the top of the base 10 and terminate respectively in thrust plates 41 seated against the nuts 42 on the aforesaid studs 40. Coil springs 43 encircle the studs 40 and are compressed between the base 10 and the plates 41, thereby holding the yoke 27 against the lever 30 with a predetermined pressure, this pressure in turn being communicated to the hydraulic support 35 to thus maintain it under a selected initial pressure.

Having thus described my invention, I claim:

1. A testing machine consisting of a cross-head, power means for causing said cross-head to transmit a load to a specimen under test, a yoke responsive to the load on said specimen, means including a hydraulic support for measuring said load, and a lever interposed between said yoke and said hydraulic support for actuating said support in accordance with the load impressed on said lever.

2. A testing machine consisting of a cross-head, power means for causing said cross-head to transmit a load to a specimen under test, a yoke responsive to the load on said specimen, means including a hydraulic support for measuring said load, a lever interposed between said yoke and said hydraulic support for actuating said support in accordance with the load impressed on said lever, and means for causing said lever to maintain a predetermined pressure on said support.

3. A testing machine consisting of a cross-head, power means for causing said cross-head to transmit a load to a specimen under test, a base supporting said power means, a yoke responsive to the load on said specimen, means including a hydraulic support for measuring said load, an indicator associated with said support, and a lever fulcrumed upon said yoke, one end of said lever having a bearing on said base and the other end of said lever being arranged to actuate said hydraulic support.

4. A testing machine consisting of a cross-head, power means for causing said cross-head to transmit a load to a specimen under test, a base supporting said power means, a yoke responsive to the load on said specimen, means including a hydraulic support for measuring said load, an indicator associated with said support, a lever fulcrumed upon said yoke, one end of said lever having a bearing on said base and the other end of said lever being arranged to actuate said hydraulic support, and means for causing said lever to maintain a predetermined pressure on said support.

5. A testing machine consisting in the combination of a mechanism for loading a specimen, a frame including a cross-head and a yoke, said cross-head being associated with the specimen to resist the applied load, a relatively small diameter hydraulic support arranged eccentric to the loading axis of said mechanism, and a lever fulcrumed on said yoke and having a bearing at one end fixed to resist a force applied to said lever by said yoke and having a bearing at its other end to actuate said hydraulic support.

JOHN P. SANNER.